(12) United States Patent
Radanovic et al.

(10) Patent No.: US 12,049,918 B2
(45) Date of Patent: Jul. 30, 2024

(54) DEVICE FOR COMPENSATING FOR TOLERANCES

(71) Applicant: Witte Automotive GmbH, Velbert (DE)

(72) Inventors: Vladimir Radanovic, Cologne (DE); Jose Luis Gonzalez Losa, Essen (DE)

(73) Assignee: Witte Automotive GmbH, Velbert (DE)

(*) Notice: Subject to any disclaimer, the term of this patent is extended or adjusted under 35 U.S.C. 154(b) by 417 days.

(21) Appl. No.: 17/383,638

(22) Filed: Jul. 23, 2021

(65) Prior Publication Data
US 2022/0049739 A1    Feb. 17, 2022

(30) Foreign Application Priority Data

Aug. 12, 2020   (DE) .................... 10 2020 210 225.2
Dec. 16, 2020   (DE) .................... 10 2020 215 990.4

(51) Int. Cl.
| | |
|---|---|
| *F16B 43/00* | (2006.01) |
| *B62D 27/02* | (2006.01) |
| *F16B 5/02* | (2006.01) |
| *F16B 37/04* | (2006.01) |
| *B62D 27/06* | (2006.01) |

(52) U.S. Cl.
CPC ............ *F16B 43/00* (2013.01); *B62D 27/065* (2013.01)

(58) Field of Classification Search
CPC ...... F16B 5/0233; F16B 5/025; F16B 5/0283; F16B 37/042; F16B 37/0807; F16B 37/044; F16B 37/04; F16B 43/00; B62D 27/065

USPC .................................................. 411/535, 546
See application file for complete search history.

(56) References Cited

U.S. PATENT DOCUMENTS

| | | | |
|---|---|---|---|
| 8,202,033 B2* | 6/2012 | Choi .................... | B62D 27/065 411/546 |
| 2007/0207012 A1* | 9/2007 | Lorenzo ................ | F16B 5/0233 411/546 |
| 2019/0092398 A1 | 3/2019 | Arisa Busquets | |
| 2020/0208661 A1 | 7/2020 | Wilke et al. | |

FOREIGN PATENT DOCUMENTS

| | | |
|---|---|---|
| CN | 1688822 A | 10/2005 |
| CN | 102654154 A | 9/2012 |
| CN | 106151243 A | 11/2016 |

(Continued)

OTHER PUBLICATIONS

China National Intellectual Property Administration, Office Action in Application No. CN202110895682.7, dated Aug. 3, 2023, 20 pages.

(Continued)

*Primary Examiner* — William D Hutton, Jr.
*Assistant Examiner* — Carl J Carlson
(74) *Attorney, Agent, or Firm* — Marshall & Melhorn, LLC

(57) ABSTRACT

A device for compensating for tolerances between two components to be connected to one another is provided. The device may have at least one base member, a compensating member which is in thread engagement with the base member. The compensating member can be moved from a starting position into a compensating position by rotating relative to the base member. The device may also have a spacer member that may be arranged on the base member.

9 Claims, 8 Drawing Sheets

(56) References Cited

FOREIGN PATENT DOCUMENTS

| | | |
|---|---|---|
| CN | 108361265 A | 8/2018 |
| CN | 108799304 A | 11/2018 |
| CN | 109072960 A | 12/2018 |
| CN | 209671387 U | 11/2019 |
| CN | 110573755 A | 12/2019 |
| CN | 209818491 U | 12/2019 |
| CN | 110925287 A | 3/2020 |
| CN | 210265389 U | 4/2020 |
| CN | 111512052 A | 8/2020 |
| DE | 10152355 A1 | 4/2003 |
| DE | 202006012493 U1 | 11/2006 |
| DE | 202007008154 U1 | 9/2007 |
| DE | 102008026414 A1 | 12/2009 |
| DE | 102011001052 A1 | 9/2012 |
| DE | 102017124809 A1 | 4/2019 |
| DE | 102018201828 A1 | 8/2019 |
| DE | 202019104173 U1 | 8/2019 |
| DE | 102018220499 A1 | 5/2020 |
| JP | 2007315580 A | 12/2007 |
| WO | 2019076595 A1 | 4/2019 |

OTHER PUBLICATIONS

China National Intellectual Property Administration, Office Action in Application No. CN 202110895682.7, dated Jan. 19, 2023, 13 pages.

* cited by examiner

DEVICE FOR COMPENSATING FOR TOLERANCES

FIELD

The invention relates to a device for compensating for tolerances between two components to be connected to one another.

BACKGROUND

Such a tolerance compensation device is basically known and is used, for example, in vehicle construction, in particular when two components need to be bolted together across a tolerance-affected joint gap. For this purpose, the tolerance compensation device is arranged between the components to be connected, and a screw member for screwing the components, for example a screw or threaded bolt, is passed through correspondingly provided openings in the components and through the tolerance compensation device. When screwing the screw member, the compensating member is rotated relative to the base member by means of a driving spring connected between the screw member and the compensating member and is thus moved from its starting position axially to the base member, e.g. it is moved out of the base member until it reaches its compensating position, in which the base member and the compensating member each lie against one of the components and thus bridge the joint gap.

SUMMARY

The object of the present invention is to specify a device, improved in relation to the prior art, for compensating for tolerances between two components to be connected to one another.

With regard to the device, the object is achieved according to the invention by the features specified in the claims.

The device according to the invention for compensating for tolerances between two components to be connected to one another comprises at least one, in particular hollow cylindrical, base member, an, in particular hollow cylindrical, compensating member which is in thread engagement with the base member and which can be moved from a starting position into a compensating position by rotating relative to the base member, and a spacer member, wherein the spacer member is arranged outside on the base member.

The advantages achieved with the invention consist, in particular, in that tolerance compensation is additionally allowed for without adjustment and thus automatically by means of such a spacer member arranged on one or both outer or end faces of the device. This results in a reduction in the complexity when assembling the device. The device is releasably connected to the components.

The spacer member limits or prevents, in particular, a so-called loss of preload force, which occurs in a tolerance compensation device made at least partially of plastics material or an assembly interface made of plastics material due to material creep or relaxation, for example plastics material creep or relaxation. In addition, by limiting or preventing the loss of preload force when assembling the device, the device can be reused as often as desired. Furthermore, the spacer member is designed to automatically clamp the base member in and/or on the component. In addition, the spacer member is designed to clamp the base member and thus the device against undesired rotation, adjustment, loosening, and/or automatic releasing during assembly or after wear in and/or on the component. For example, the spacer member is made of metal, in particular steel.

The spacer member is set, for example, in its hardness and dimensions such that it holds, in particular automatically locks, the base member clamped or tensioned in a pre-assembly position, the starting position and/or the compensating position on the component, in order to counteract the loss of preload force.

For example, the spacer member is a compression limiter. The spacer member has an upper side and a lower side. The spacer member has, for example, an inner side that forms a through opening. The through opening is provided, for example, to receive a fastening member. Furthermore, the spacer member has an outer side which is provided and designed to come into contact with a component structure and to lock thereon, for example, automatically when the spacer member is being inserted or is inserted into the component structure. For example, the device can be used in different assemblies. The spacer member reinforces the device, in particular the base member, and withstands loads that are exerted, for example, by the fastening member. The spacer member, in particular with the function of a compression limiter, reduces stress relaxation and flow elongation of the base member during assembly of the device. By means of the spacer member, a relaxation behavior or creep behavior of the device, in particular of the base member, can be substantially reduced or even prevented. The device is in particular a preassembled unit. This means that the base member, the compensating member, and the spacer member are preassembled to form a unit. The spacer member is preassembled on the base member, for example to simplify transport and pre-assembly on a component, and can be assembled together with the base member and the compensating member in a customer interface.

In one possible embodiment, the spacer member is designed as a retaining ring or a spacer sleeve. For example, the spacer member is releasably arranged on at least one of the end faces of the device. The spacer member is arranged coaxially to the base member and to the compensating member. The spacer member has, for example, a T-shape in section. In addition, the spacer member is provided with at least one or more fastening members, by means of which the spacer member can be releasably fastened to the device, in particular to the base member.

In one development, the spacer member can be prepositioned in the component structure. The base member with the compensating member is then inserted as a two-part, preassembled unit into the component structure with a prepositioned spacer member. In the inserted state of the base member, it is clipped and latched to the spacer member, for example.

The spacer member comprises, for example, at least one retaining member which lies against an outer circumference of the base member. In one development, the spacer member comprises at least two retaining members, which each lie against the outer circumference of the base member. The retaining members are, for example, arranged opposite one another on the outer circumference of the spacer member. For example, the corresponding retaining member is designed as a spring member. The corresponding retaining member has, for example, a preload. The base member is clipped and latched, for example, between the retaining members. The retaining members are designed, for example, in the form of retaining clips. The retaining members clamp the base member in the direction of the spring preload thereof. This means that a spring force of the respective retaining member is directed in the direction of the base member in the inserted or preassembled state. The spacer member is designed, for example, as a clamping ring or clamping disk. The corresponding retaining member is designed, for example, as a clamping tongue. The base member has, for example, a radially circumferential recess on the outer circumference. Alternatively, the base member has a recess corresponding to the corresponding retaining member on the outer circumference, into which recess the corresponding retaining member engages in order to prevent rotation and to interlock into the base member. The advantages in this case are that low-force pre-assembly of the device is made possible in a bore or a blind hole.

The retaining members of the spacer member allow larger tolerance pairs to be achieved between the bore and the base member. The spacer member is made of a plastics material, for example, and can substantially be pressed into the bore or the blind hole.

The device itself is, for example, a tolerance compensation device, in particular for compensating for tolerances when a component is fastened to a component using a bore or a blind hole. Tolerance compensation devices are part of fastening members for fastening components and parts to one another, for example in motor vehicles. For example, such tolerance compensation devices are pressed into one of the components. In particular, the device is an automatic tolerance compensation system.

In one possible embodiment, the spacer member is fastened to the base member in a releasable or non-releasable manner. For example, the spacer member can be arranged as a ring or a disk on the end face of the base member and, for example, be connected to the base member with corresponding counterclip members and retaining members via releasable retaining members, for example in the form of clip members and retaining members. In an alternative or optionally additional embodiment, the spacer member can be connected with a material fit to the base member on the end face, for example glued or welded. In other words: the spacer member is, for example, connected to the base member with a force, material, and/or form fit.

In one possible embodiment, the compensating member is arranged on a first end face of the base member and the spacer member is arranged on a second end face of the base member opposite the first end face. The compensating member and the spacer member are separate components. The compensating member is arranged on the first end face of the base member, i.e. viewed in the axial direction of the base member. The spacer member is arranged on the second end face of the base member, i.e. viewed in the axial direction of the base member.

In one possible embodiment, the spacer member is designed as a retaining ring or retaining disk. If the device, in particular the tolerance compensation device, is inserted into an interface of a component made of plastics material, the spacer member is designed to substantially limit or even prevent a loss of preload force, which can occur, for example, as a result of the relaxation of the material of the base member.

In one possible embodiment, the spacer member is arranged coaxially to the base member. An outer circumference of the spacer member is equal to an outer circumference of the base member. In one development, the outer circumference of the spacer member can vary. The spacer member has, for example, a circular design. Alternatively, the spacer member can have a different shape, for example a polygonal shape.

In one possible embodiment, the spacer member comprises at least one retaining member which, in the assembled state, is in latching engagement with at least one fastening member arranged on the base member.

In one possible embodiment, the retaining member is designed as a latching loop and the fastening member is designed as a latching hook.

In one possible embodiment, the spacer member comprises at least two opposing retaining members which, in the assembled state, are each in latching engagement with a fastening member arranged on the base member.

In one possible embodiment, the spacer member comprises a base part and a spacer sleeve projecting centrally from the base part. The spacer sleeve has, for example, a through opening on the inside through which a fastening member, for example a fastening screw, can be passed. The corresponding retaining member projects, for example, perpendicularly from the base part. For example, the corresponding retaining member has a substantially U-shaped or C-shaped design. Two opposing legs of the corresponding retaining member are arranged at the open end on the base part and connected thereto. For example, the corresponding retaining member is molded or injection-molded onto the base part. In particular, the corresponding retaining member forms a loop or a ring. The spacer sleeve is designed centrally on the base part, for example. The spacer sleeve is formed, for example, by material deformation in a central region of the base part.

The spacer sleeve protrudes into an opening in the component, for example in the prepositioned or fixed state. The spacer sleeve is, for example, arrangeable or arranged completely in the opening. The spacer sleeve is designed, for example, to automatically lock the spacer member and thus the base member in the opening. The spacer sleeve has a suitable hardness and dimension in order to counteract the loss of preload force in the region of the opening of the component. For example, the loss of preload force that can be generated by material creep or relaxation of the component relative to the base member can be limited or even prevented.

One possible embodiment of the device provides that the compensating member is a component formed from a plastics material or different plastics materials, for example in an injection molding process.

DESCRIPTION OF THE FIGURES

Embodiments of the invention are explained in greater detail with reference to drawings, in which.

Parts corresponding to each other are provided with the same reference signs in all figures.

DETAILED DESCRIPTION

Figure 1:
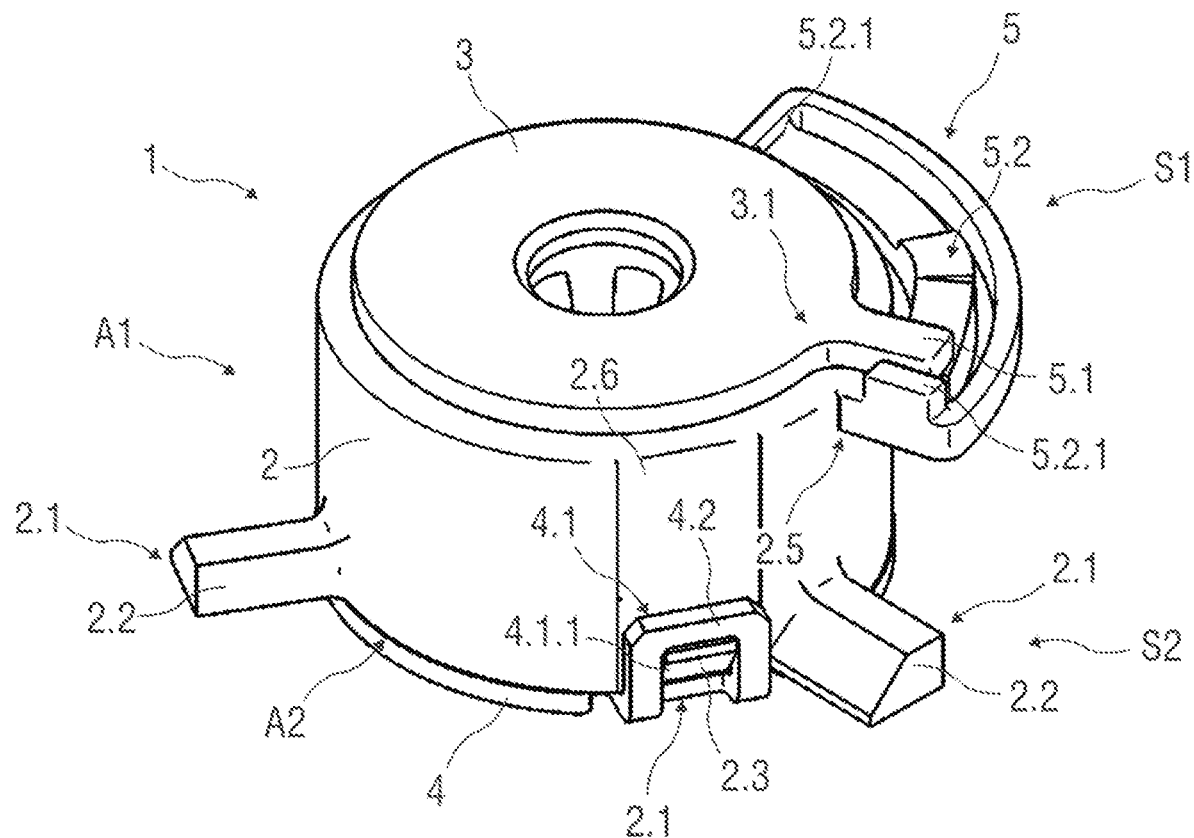
FIG. 1 is a schematic view of an embodiment of a device for compensating for tolerances in a perspective view from above of a compensating member, a spacer member being fastened to a base member.

FIG. 1 is a schematic perspective view of an embodiment of a device 1 for compensating for tolerances between two components (not shown in FIG. 1) to be connected to one another. The device 1 for compensating for tolerances will hereinafter be referred to for short as the device 1 or also as the tolerance compensation device.

The device 1 has at least one base member 2, a compensating member 3, and a spacer member 4.

The base member 2, the compensating member 3, and the spacer member 4 are designed as hollow cylindrical members.

The base member 2 comprises one or more fastening members 2.1 by means of which the device 1 can be fastened to a first component B1 (shown in FIGS. 5 to 8). For example, the respective fastening member 2.1 is designed as a projection 2.2, in particular a latching projection or retaining projection or fastening hook. For example, the fastening members 2.1 are molded onto the base member 2. The base member 2 is formed from a plastics material, for example.

The spacer member 4 is provided in order to substantially reduce or even prevent plastics material creep or plastics material relaxation. The spacer member 4 is also designed to radially and/or axially compensate for tolerances between a bore or a blind hole, in which the device 1 can be arranged, and the device 1.

The spacer member 4 is provided, for example, in addition to covering an end face S2 of the base member 2. The compensating member 3 is arranged on an end face S1 of the base member 2 opposite the end face S2.

To fasten the spacer member 4 to the device 1, the base member 2 comprises further fastening members 2.1, which are designed, for example, as a latching hook 2.3 or a latching lug. The fastening members 2.1 are molded or injection-molded onto the base member 2, for example.

For this purpose, the spacer member 4 comprises a corresponding retaining member 4.1, in particular a latching loop 4.2. The retaining members 4.1 are molded or injection-molded onto the spacer member 4, for example. For example, the spacer member 4 is formed from a plastics material. The spacer member 4 can also be formed from one or more materials, for example plastics material and/or metal. The retaining members 4.1 are formed, for example, by material deformations. In particular, the spacer member 4 comprises at least two opposing retaining members 4.1 which, in the assembled state, are each in latching engagement with a fastening member 2.1 arranged on the base member 2. The retaining members 4.1 have, for example, substantially the same height in the axial direction of the base member 2 as the projections 2.2.

By means of the latching loops 4.2, the spacer member 4 is suspended and held from the latching hook 2.3 of the base member 2. The spacer member 4 thus comprises at least one retaining member 4.1, which is designed in the form of a loop or a ring and has an opening 4.1.1. The opening 4.1.1 is provided to receive the corresponding fastening member 2.1 of the base member 2. The corresponding fastening member 2.1 is guided to the outside through the opening 4.1.1 and locked therein.

For example, the base member 2 comprises an axially extending locking surface 2.6. The locking surface 2.6 is, for example, an axially flat surface. For example, the locking surface 2.6 runs perpendicular to the radial outer circumference A1 of the base member 2. The locking surface 2.6 is designed, for example, as a flat edge. The locking surface 2.6 is provided in order to support the attachment of the spacer member 4 to the base member 2. In one embodiment (not shown), the locking surface 2.6 is only designed radially in the region of the end face S2 of the base member 2. The locking surface 2.6 is designed to lie flat against an inner side of the retaining member 4.1 and to prevent the spacer member 4 from rotating relative to the base member 2.

In one development, the corresponding retaining member 4.1 is designed as a spring member. The corresponding retaining member 4.1 has, for example, an inwardly directed preload, i.e. in the direction of the base member 2. The base member 2 is clipped and latched, for example, between the retaining members 4.1. The retaining members 4.1 are designed, for example, in the form of retaining clips or retaining tongues. The retaining members 4.1 clamp the base member 2 in the direction of their spring preload. When inserting the base member 2 between the retaining members 4.1, these can be moved outward against their spring force. The spacer member 4 is designed, for example, as a clamping ring or clamping disk. The corresponding retaining member 4.1 is designed, for example, as a clamping tongue. The base member 2 has, for example, a radially circumferential recess (not shown in detail) on the outer circumference A1. The recess is designed, for example, in the region of the end face S2. Alternatively, the base member 2 has a recess corresponding to the corresponding retaining member 4.1 on the outer circumference A1, for example in the form of a groove, into which the corresponding retaining member 4.1 engages in the assembled state.

The retaining members 4.1, which are designed as latching loops 4.2 in the illustrated embodiment, are designed, for example, as securing members for securing the spacer member 4 against movement relative to the base member 2. The securing members thereby form, for example, a transport safeguard for the device 1 in order to prevent the spacer member 4 from being inadvertently released from the base member 2 during transport of the same. If the device 1, in particular the device 1 designed as a tolerance compensation device, is inserted into an interface of a component B1 made of plastics material, the spacer member 4 is configured to substantially limit or even prevent a loss of preload force, which can occur, for example, as a result of the relaxation of the material of the base member 2 and/or the component B1.

Furthermore, an outer circumference A2 of the spacer member 4 corresponds to the outer circumference A1 of the base member 2. Alternatively, the outer circumference A2 of the spacer member 4 can vary and, for example, be larger or smaller than that of the base member 2.

Furthermore, the device 1 comprises a securing arrangement 5 for securing the compensating member 3 against movement relative to the base member 2. The securing arrangement 5 forms a transport safeguard for the device 1 in order to prevent unintentional movement of the compensating member 3 relative to the base member 2 during transport of the same.

The securing arrangement 5 comprises a first securing member 5.1 formed on an outer circumference, for example on an edge of a contact portion 3.1 of the compensating member 3. The first securing member 5.1 is molded onto the compensating member 3. The first securing member 5.1 is designed as a projecting pin or cam.

Furthermore, the securing arrangement 5 comprises a second securing member 5.2 arranged on an outer circumference, for example on an edge of a contact portion 2.5, on the base member 2. The second securing member 5.2 is molded onto the base member 2. The second securing member 5.2 is designed, for example, as an outer guide or cam track for forced guidance of the first securing member 5.1. The second securing member 5.2 is designed in the form of a segment of a circle and has end stops 5.2.1.

Figure 2:
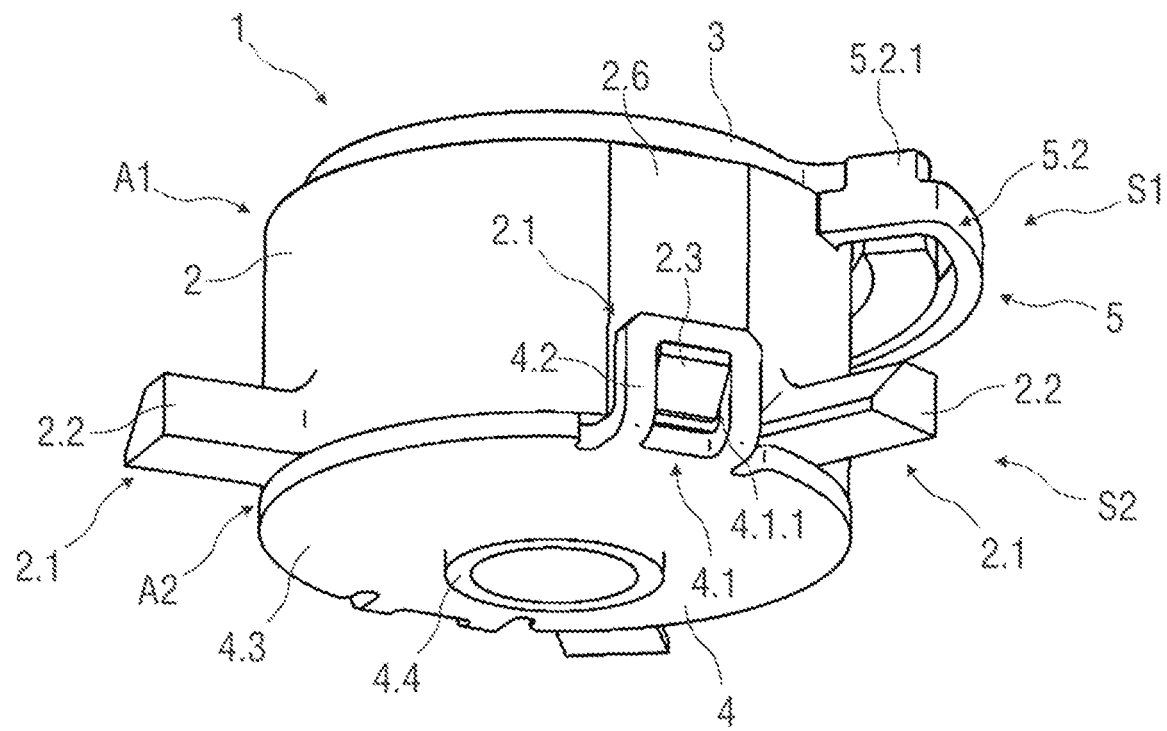
FIG. 2 is a schematic view of an embodiment of a device for compensating for tolerances in a perspective view from below of a spacer member fastened to the device.

FIG. 2 is a schematic view of the device 1 in a perspective view from below of the spacer member 4 fastened to the device 1.

The spacer member 4 is designed as a compression limiter. For example, the spacer member 4 comprises a base part 4.3, which is designed in the form of a circular ring, with a spacer sleeve 4.4 projecting centrally from the base part 4.3. The spacer sleeve 4.4 protrudes from the base part 4.3 in the direction away from the base member 2. Alternatively, the spacer sleeve 4.4 can also protrude in the direction of the base member 2 into a cavity H1 of the base member 2.

The respective retaining member 4.1 protrudes outward from an outer circumferential surface of the base part 4.3. For example, the respective retaining member 4.1 has a substantially L-shaped or J-shaped or C-shaped design in a side view.

Figure 3:
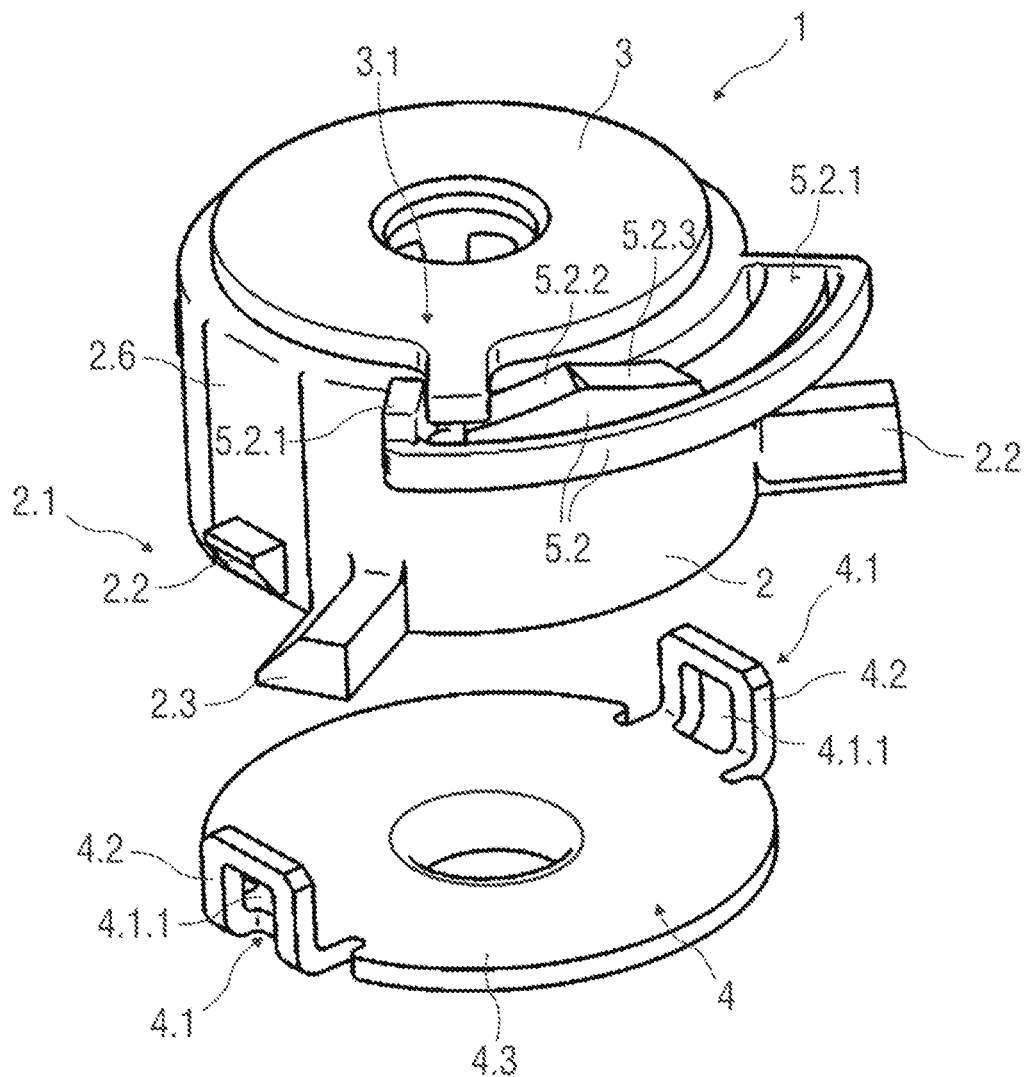
FIGS. 3 to 4 are schematic exploded views of the device.
Figure 4:
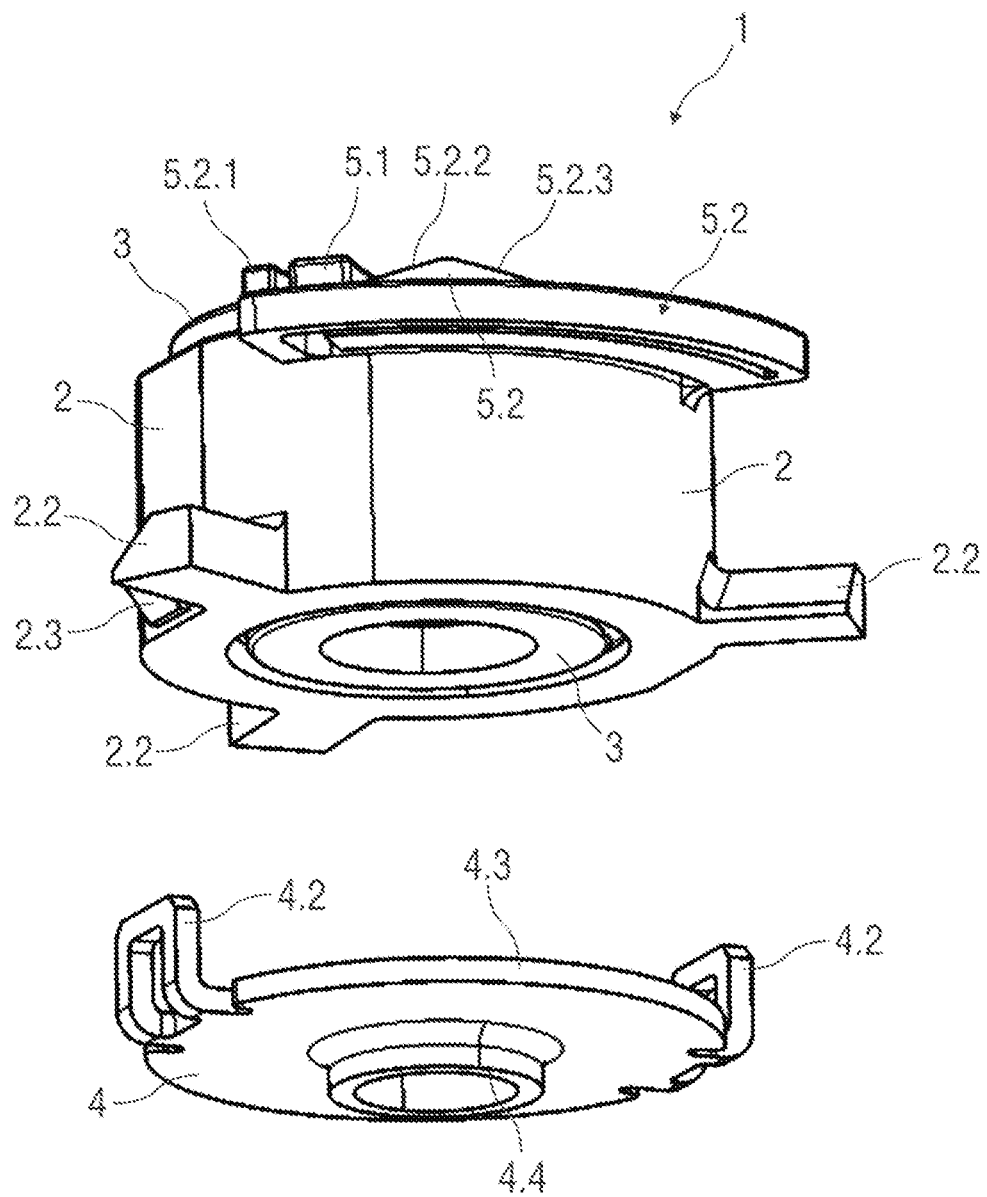

FIGS. 3 to 4 are schematic exploded views of the device 1.

The second securing member 5.2 is designed as a guide or cam track with an ascending guide surface 5.2.2 (=inclined ascending plane of the cam track) and a descending guide surface 5.2.3 (=inclined descending plane of the cam track).

The projections 2.2 for fastening the first component B1 also have an ascending retaining surface.

The spacer member 4 comprises two opposing retaining members 4.1, for example in the form of retaining loops.

To achieve automatic tolerance compensation without adjustment, the spacer member 4 comprises the spacer sleeve 4.4 pointing away from the device 1. The spacer member 4 is made of plastics material, for example. The spacer sleeve 4.4 automatically limits or prevents a so-called loss of preload force in the inserted state on the first component B1 without additional manual adjustment. The spacer member 4 is arranged, for example, in the first component B1. In the inserted state of the device 1, the spacer member 4 is arranged in the first component B1 between the component B1 and the base member 2.

The device 1 with the spacer member 4 is particularly suitable for use on components which are made of plastics material and consequently have a so-called creep tendency or relaxation tendency.

FIGS. 5 to 8 are different schematical views of the device 1 in the state arranged on the first component B1.

The first component B1 has fastening means 6 corresponding to the fastening members 2.1, which are releasably connected to one another in the assembled state. The fastening means 6 are designed, for example, as flexible latching hooks 2.3 which snap into place on the projections 2.2 with a form and/or a force fit.

Figure 5:
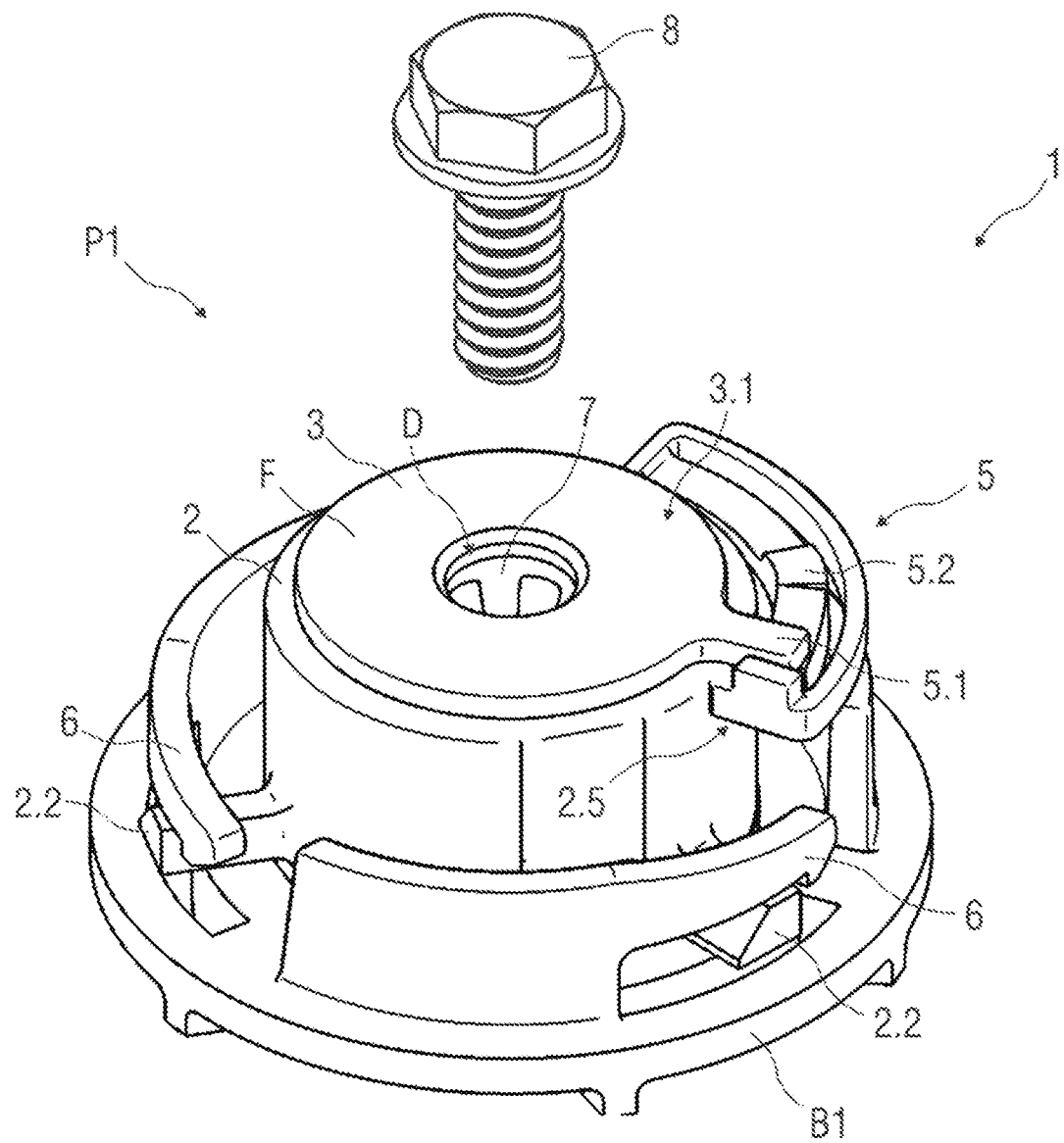
FIGS. 5 to 8 are different schematic views of the device in the state arranged on a component.
Figure 6:
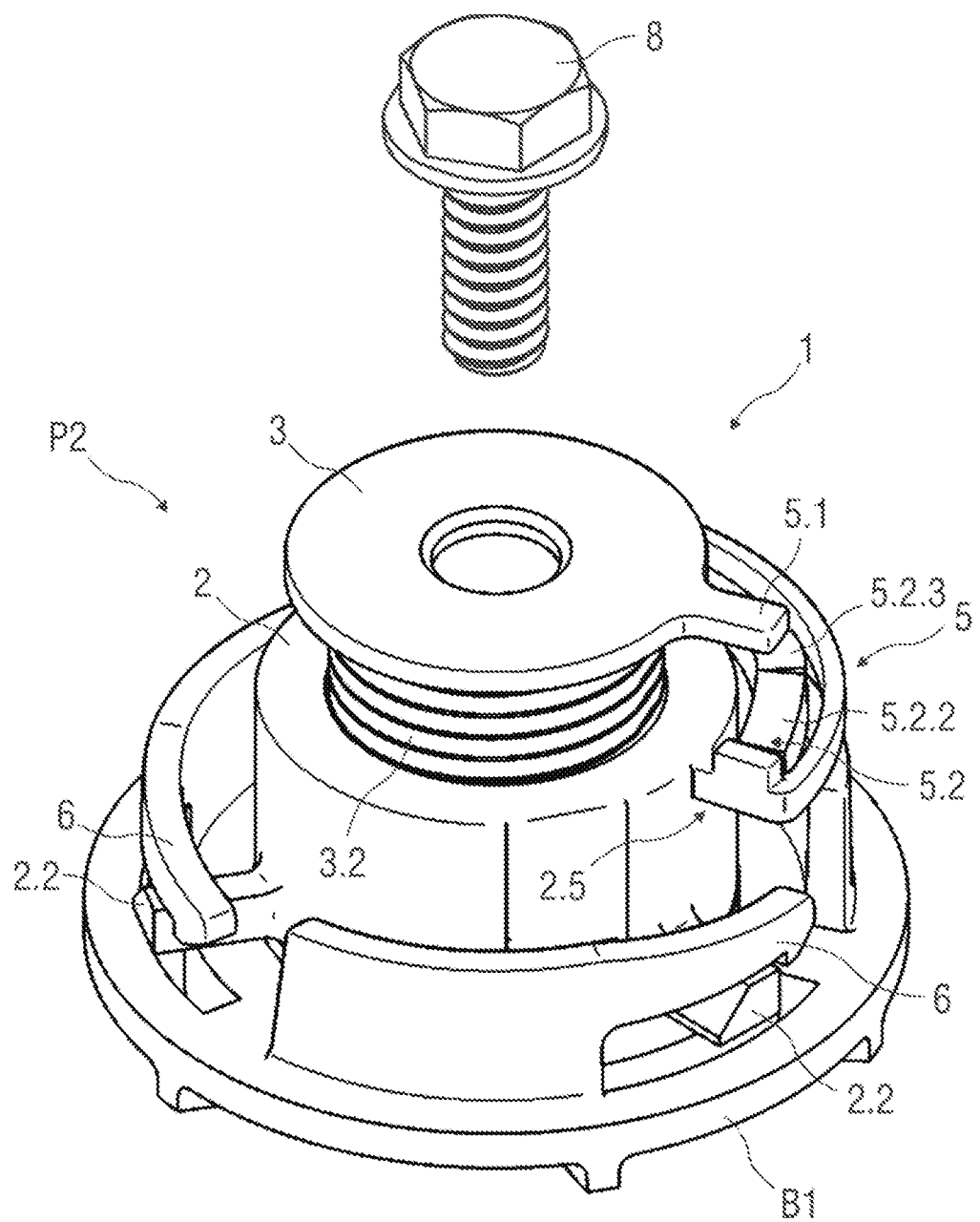

FIG. 5 shows the device 1 in a starting position P1, in which the compensating member 3 is arranged in the base member 2. FIG. 6 shows the device 1 in a tolerance-compensating position, in which the compensating member 3 is placed in an extended position with respect to the base member 2 and the first component B1.

The base member 2 is designed as a hollow cylinder and has an internal thread 2.4 on the inner side thereof, i.e. on a lateral surface of its inner cavity H1. The internal thread 2.4 has an orientation that is reversed to an external thread 3.2 of the compensating member 3.

The compensating member 3, which is also designed as a hollow cylinder, extends into the cavity H1 of the base member 2 and has the external thread 3.2 on the outer side thereof, which engages with the internal thread 2.4 of the base member 2. By rotating, the compensating member 3 can be moved along a longitudinal central axis L relative to the base member 2, i.e. screwed out of or into the cavity H1 of the base member 2, as is shown with the sequence of FIGS. 5 and 6 or FIGS. 7 and 8.

Figure 7:
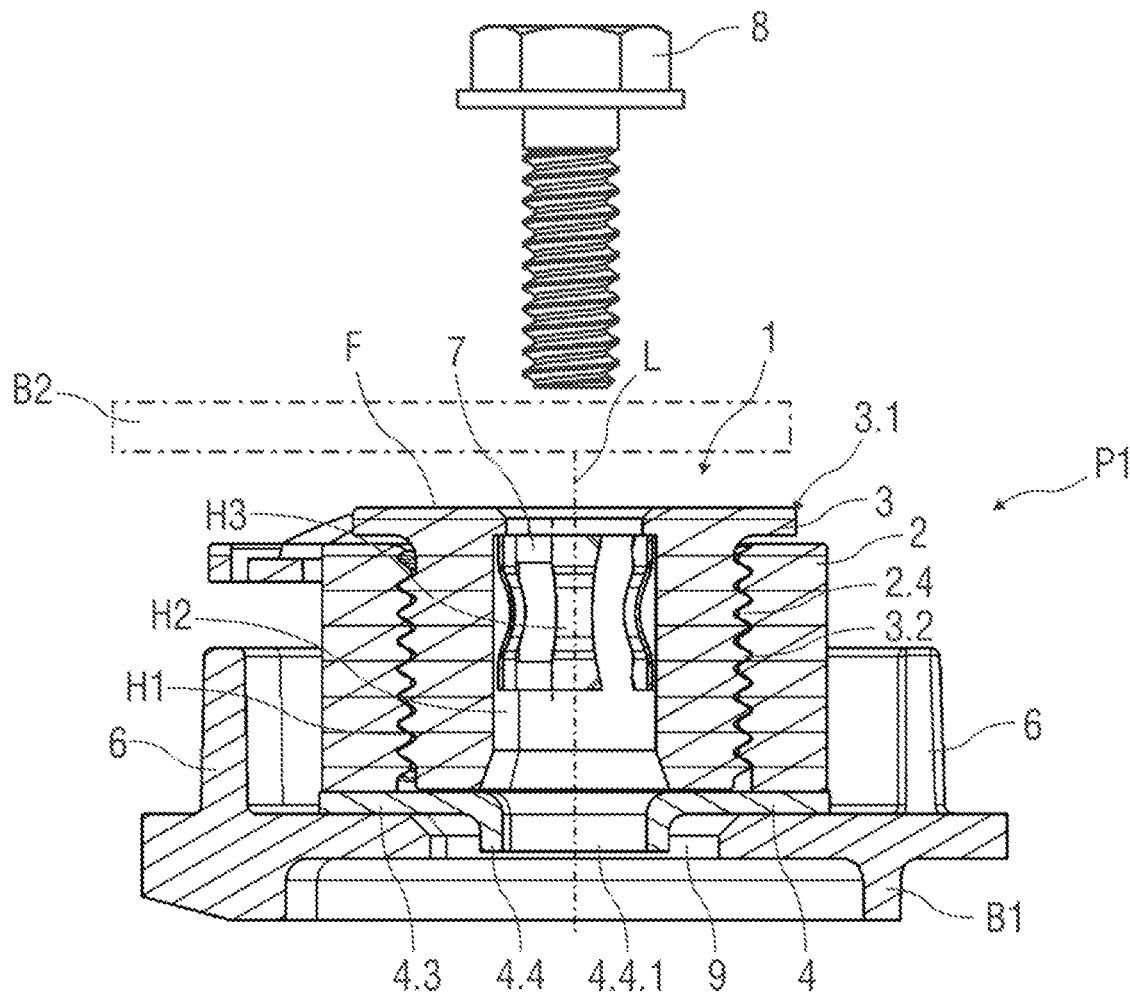
Figure 8:
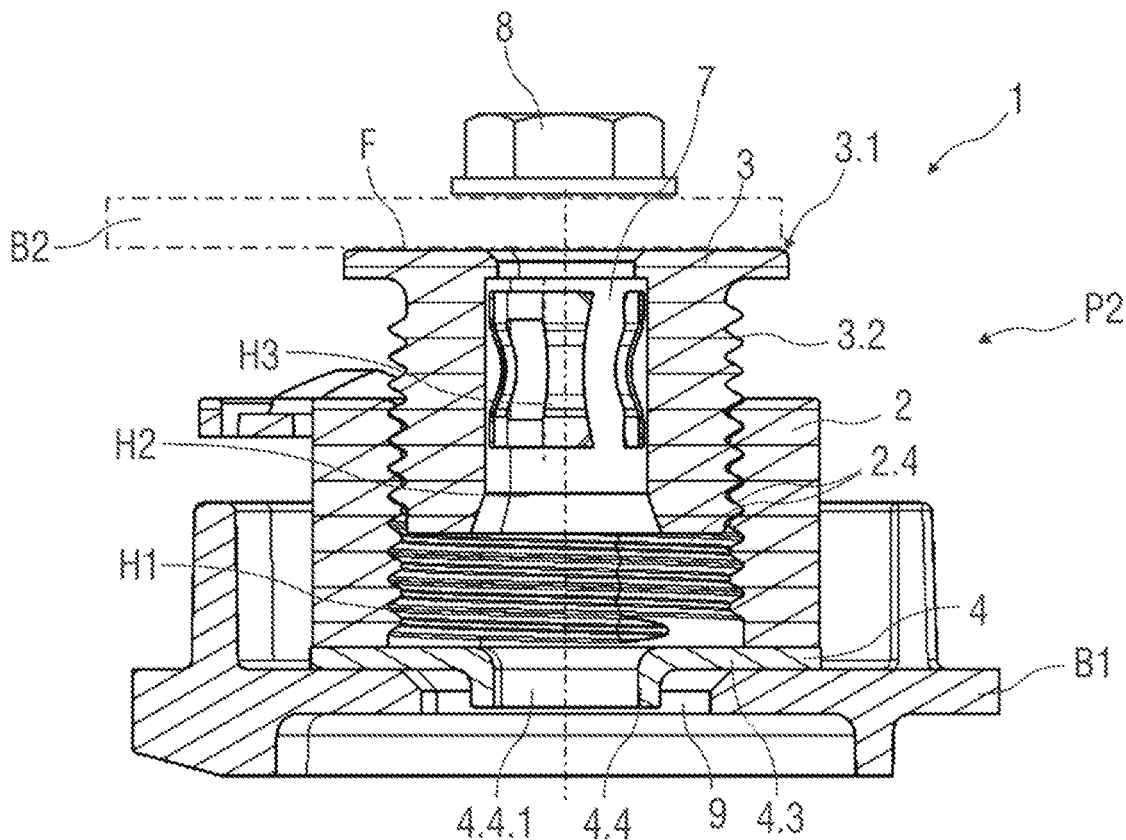

In an inner cavity H2 of the compensating member 3, there is arranged a driving member 7, designed for example as a driving spring and formed for example from spring steel, which driving member is shown in FIGS. 5, 7, and 8. The driving member 7 is supported on the outer surface of the cavity H2 of the compensating member 3. The driving member 7 is in frictional engagement with the screw member 8 passed through the device 1, i.e. through the hollows H1, H3 of the base member 2 and driving member 7, in order to transmit a torque exerted by the screw member 8 to the compensating member 3.

The spacer member 4 is arranged between the device 1 and the first component B1 and has a T-shape in section. The spacer member 4 is arranged and designed between the device 1 and the first component B1 in such a way that tolerances due to the creep tendency or the relaxation tendency of the material of the first component B1 are automatically compensated for.

For this purpose, the base part 4.3 is arranged flat on the device 1 and the first component B1 and coaxially thereto. The spacer sleeve 4.4 projects in the direction of the first component B1 and extends, for example, into an opening 9 of the first component B1. The spacer sleeve 4.4 has a through opening 4.4.1. An inner circumference of the spacer sleeve 4.4, i.e. the through opening 4.4.1, substantially corresponds to an inner circumference of the cavity H2 of the compensating member 3. In one development, the inner circumference of the spacer sleeve 4.4 substantially corresponds to an inner circumference of the cavity H3 of the driving member 7. The spacer sleeve 4.4 is used, for example, to preposition the device 1 in the first component B1.

To screw the components B1 and B2, the device 1 is arranged therebetween and the screw member 8 is guided from above through an opening of the second component B2, the device 1, i.e. the passage D and the cavities H1, H2, and for example through the opening 9 of the first component B1. In the process, the screw member 8 comes into engagement with the driving member 7, which is arranged in the compensating member 3. For example, the contact portion 3.1 of the compensating member 3 serves to support the device 1 against the second component B2. For this purpose, the contact portion 3.1 has a flat contact surface F, which extends perpendicular to the longitudinal central axis L, and a central passage D for the screw member 8. In the inserted state of the device 1, the compensating member 3 is arranged between the components B1, B2 between the component B2 and the base member 2.

If the screw member 8 is rotated to screw the components B1 and B2, a torque is transmitted to the compensating member 3 by means of the driving member 7, which causes a rotation of the compensating member 3 relative to the base member 2 and first component B1, whereby the compensating member 3 moves upward out of the base member 2 along the longitudinal central axis L.

During the assembly of the device 1 and the transmission of the torque from the screw member 8 to the compensating member 3, the latter is rotated in such a way that the first securing member 5.1 slides over the second securing member 5.2, overcoming a predetermined securing torque, and allows the movement of the compensating member 3 out of the base member 2. The predetermined securing torque is smaller than the torque that can be transmitted from the screw member 8 to the compensating member 3 via the driving member 7.

As soon as the compensating member 3 has moved so far out of the base member 2 that a contact portion 3.1 lies, with a contact surface F, against a second component B2, a frictional torque between the second component B2 and the contact surface F exceeds the torque that can be transmitted by the driving member 7 and the compensating member 3 is no longer rotated out from the driving member 2. The compensating member 3 has thus assumed a position referred to as the compensating position P2.

LIST OF REFERENCE SIGNS

1 Device for compensating for tolerances
2 Base member
2.1 Fastening member
2.2 Projection
2.3 Latching hook
2.4 Internal thread
2.5 Contact portion
2.6 Locking surface
3 Compensating member
3.1 Contact portion
3.2 External thread
4 Spacer member
4.1 Retaining member
4.1.1 Opening
4.2 Latching loop
4.3 Base part
4.4 Spacer sleeve
4.4.1 Through opening
5 Securing arrangement
5.1 First securing member
5.2 Second securing member
5.2.1 End stop
5.2.2 Ascending guide surface
5.2.3 Descending guide surface
6 Fastening means
7 Driving member
8 Screw member
9 Opening
A1, A2 Outer circumference
B1, B2 Component
D Passage
F Contact surface
H1 to H3 Cavity
L Longitudinal central axis
P1 Starting position
P2 Compensating position
S1, S2 End face

The invention claimed is:

1. A device for compensating for tolerances between two components to be connected to one another, the device comprising at least:
a base member,
a compensating member which is in thread engagement with the base member and which can be moved from a starting position into a compensating position by rotating relative to the base member, and
a spacer member,
wherein the spacer member is arranged on the base member,
wherein the compensating member is arranged on a first end face of the base member and the spacer member is arranged on a second end face of the base member opposite the first end face.

2. The device according to claim 1, wherein the spacer member is fastened to the base member in a releasable or non-releasable manner.

3. The device according to claim 1, wherein the spacer member is designed to automatically clamp the base member in and/or on the component at least to limit a loss of preload force.

4. The device according to claim 1, wherein the spacer member is designed to compensate for tolerances due to the creep tendency or relaxation tendency of a material of the base member and/or of the component.

5. The device according to claim 1, wherein the spacer member is made of metal, including steel, and is set in its hardness and dimensions such that it automatically locks the base member in a pre-assembly position, the starting position, and/or the compensating position.

6. The device according to claim 1, wherein the spacer member comprises at least one retaining member which, in the assembled state, is in latching engagement with at least one fastening member arranged on the base member.

7. The device according to claim 6, wherein the retaining member is designed as a latching loop and the fastening member is designed as a latching hook.

8. The device according to claim 1, wherein the spacer member is designed as a compression limiter for tolerance compensation without an adjustment to be performed on the spacer member.

9. The device according to claim 1, wherein the spacer member comprises a base part and a spacer sleeve projecting centrally from the base part.

* * * * *